(12) United States Patent
Chizeck et al.

(10) Patent No.: US 9,148,443 B2
(45) Date of Patent: Sep. 29, 2015

(54) ENHANCED SECURITY AND SAFETY IN TELEROBOTIC SYSTEMS

(71) Applicant: University of Washington through its Center for Commercialization, Seattle, WA (US)

(72) Inventors: Howard Jay Chizeck, Mercer Island, WA (US); Tamara Bonaci, Redmond, WA (US); Thomas Lendvay, Seattle, WA (US)

(73) Assignee: University of Washington Through its Center for Commericalization, Seattle, WA (US)

( * ) Notice: Subject to any disclaimer, the term of this patent is extended or adjusted under 35 U.S.C. 154(b) by 277 days.

(21) Appl. No.: 13/935,436

(22) Filed: Jul. 3, 2013

(65) Prior Publication Data

US 2014/0068770 A1    Mar. 6, 2014

Related U.S. Application Data

(60) Provisional application No. 61/668,590, filed on Jul. 6, 2012.

(51) Int. Cl.
| | |
|---|---|
| *H04L 29/06* | (2006.01) |
| *G06F 21/55* | (2013.01) |
| *G06F 21/31* | (2013.01) |
| *G06F 21/00* | (2013.01) |

(52) U.S. Cl.
CPC .......... *H04L 63/1425* (2013.01); *G06F 21/316* (2013.01); *G06F 21/552* (2013.01); *H04L 63/126* (2013.01); *G06F 21/00* (2013.01); *H04L 29/06* (2013.01)

(58) Field of Classification Search
USPC ............ 726/23; 700/245, 250, 253, 254, 258, 700/259
See application file for complete search history.

(56) References Cited

U.S. PATENT DOCUMENTS

| | | | |
|---|---|---|---|
| 4,278,837 | A | 7/1981 | Best |
| 7,806,891 | B2 | 10/2010 | Nowlin et al. |
| 8,216,250 | B2 | 7/2012 | Orban, III et al. |
| 8,311,791 | B1 | 11/2012 | Avisar |

(Continued)

OTHER PUBLICATIONS

K. Coble et al. "Secure Software Attestation for Military Telesurgical Robot Systems", IEEE Military Communications Conference, Oct. 31, 2010, pp. 965-970, San Jose, CA.

(Continued)

*Primary Examiner* — Brandon Hoffman
*Assistant Examiner* — Samuel Ambaye
(74) *Attorney, Agent, or Firm* — McDonnell Boehnen Hulbert & Berghoff LLP

(57) ABSTRACT

Methods and systems for securing remotely-operable devices are provided. A security device can receive a plurality of commands to control a remotely-operable device in a remote environment. At least one command in the plurality of commands can include command data that is related to the remotely-operable device. The security device can receive a plurality of responses to the plurality of commands. The security device can process the plurality of commands and the plurality of responses to determine a signature related to an operator that issued the plurality of commands for the remotely-operable device. The security device can determine an identity of the operator based on the signature. The security device can generate an identity report that includes the identity of the operator.

25 Claims, 10 Drawing Sheets

(56) References Cited

U.S. PATENT DOCUMENTS

| | | | |
|---|---|---|---|
| 2004/0204743 A1* | 10/2004 | McGrath et al. | 607/5 |
| 2005/0283198 A1* | 12/2005 | Haubrich et al. | 607/30 |
| 2007/0185547 A1* | 8/2007 | Hoyme et al. | 607/60 |
| 2010/0169815 A1* | 7/2010 | Zhao et al. | 715/771 |
| 2012/0189996 A1 | 7/2012 | Hager et al. | |
| 2012/0253360 A1 | 10/2012 | White et al. | |

OTHER PUBLICATIONS

G. Lee et al, "Cyberphysical Systems Security Applied to Telesurgical Robotics", Computer Standards and Interfaces, 2012, vol. 34, pp. 225-229.

G. Lee et al. "Secure Haptics and Robotics: Adaptation to Fitts' Law Performance Measure for Multi-Target Task Comparisons", Technical Report UTDCS-23-08, Aug. 2008, Department of Computer Science, Unversity of Texas, Dallas, TX.

G. Lee et al. "Secure Haptics and Robotics: Influence of Mismatched Haptic and Visual Display Scales", Technical Report UTDCS-18-08, Jul. 2008, Department of Computer Science, Unversity of Texas, Dallas, TX.

J. Rosen et al., "Markov Modeling of Minimally Invasive Surgery Based on Tool/Tissue Interaction and Force/Torque Signatures for Evaluating Surgical Skills", IEEE Transactions on Biomedical Engineering, May 2001, pp. 579-591, vol. 48, No. 5.

M Tozal et al., "Adaptive Information Coding for Secure and Reliable Wireless Telesurgery Communications", Mobile Networks and Applications, Jul. 2011, pp. 1-15.

M. Tozal et al., "On Secure and Resilient Telesurgery Communications over Unreliable Networks", 2011 IEEE Conference on Computer Communications Workshops (INFOCOM WKSHPS), Apr. 10, 2011, pp. 714-719.

Zhang, X. et al. (2002) "Secure Coprocessor-based Intrusion Detection," in Proceedings of the 10th Workshop on ACM SIGOPS, pp. 239-242.

Anderson, R. (2006) "Cryptographic Processors—A Survey," in Proceedings of the IEEE, 94(2):357-369.

Bencsaáth, B. et al. (2012) "Duqu: Analysis, Detection, and Lessons Learned," in Proceedings fo the 5th ACM European Workshop on System Security, 6 pp.

Bhattacharjee, B. et al. (2006) "Using secure coprocessors for privacy preserving collaborative data mining and analysis," in Proceedings of the 2nd International Workshop on Data Management on New Hardware, 7 pp.

Bonaci, T. and H.J. Chizeck (2012) "Surgical Telerobotics Meets Information Security," RSS 2012 Workshop on Algorithmic Frontiers in Medical Robotics: Manipulation in Uncertain, Deformable, Heterogeneous Environments. Sydney, Australia, Jul. 2012, 2 pp.

Cárdenas, AA et al. (2011) "Attacks Against Process Control Systems: Risk Assessment, Detection, and Response," in Proceedings of the 6th Symposium on Information, Computer and Communications Security, pp. 355-366.

Chen, TM (2010) "Stuxnet, the Real Start of Cyber Warfare?" IEEE Network, 24(6):2-3.

Denning, DE (1987) "An Intrusion-Detection Model," IEEE Transactions on Software Engineering, SE-13(2):222-232.

Dowler, N. And CJ Hall (1995) "Safety Issues in Telesurgery—Summary," in IEEE Colloquium on Towards Telesurgery, pp. 6/1-6/3.

Duri, S. et al. (2002) "Framework for Security and Privacy in Automotive Telematics," in Proceedings of the 2nd International Workshop on Mobile Commerce, pp. 25-32.

Fink, RA et al. (2009) "TPM Meets DRE: Reducing the Trust Base for Electronic Voting Using Trusted Platform Modules," IEEE Transactions on Information Forensics and Security, 4(4):628-637.

Fodero, K. et al. (2006) "Control system architecture for a minimally invasive surgical robot," in Proceedings of the 14th "Medicine Meets Virtual Reality" Conference, pp. 156-158.

Harnett, BM et al. (2008) "Evaluation of unmanned airborne vehicles and mobile robotic telesurgery in an extreme environment," Telemedicine and e-Health, 14(6):539-544.

Hu, JC et al. (2009) "Comparative effectiveness of minimally invasive vs. open radical prostatectomy," Journal of the American Medical Association, 302(14):1557-1564.

Itoi, N. (2000) "Secure Coprocessor Integration with Kerberos V5," in Proceedings of the 9th USENIX Security Symposium, 17 pp.

Kalan, S. et al. (2010) "History of robotic surgery," Journal of Robotic Surgery, 4(3):141-147.

Kaufman, C. et al. (2002) "Network Security: Private Communication in a Public World", Prentice Hall, pp. 47-50, 224-226.

Kemmerer, RA and G. Vigna (2002) "Intrusion Detection: A Brief History and Overview," Computer, 35(4):27-30.

King, HH et al. (2009) "Preliminary protocol for interoperable telesurgery," in Proceedings of the International Conference on Advanced Robotics, pp. 1-6.

Lackey, RJ and DW Upmal (1995) "Speakeasy: The Military Software Radio," IEEE Communications Magazine, 33 (5):56-61.

Lum, M. et al. (2007) "Field Operation of a Surgical Robot via Airborne Wireless Radio Link," in Proceedings of the IEEE International Conference on Field and Service Robotics, 7 pp.

Lum, M. et al. (2009) "Effect of Time Delay on TeleSurgical Performance," in Proceedings of the IEEE International Conference on Robotics and Automation, pp. 4246-4252.

Makris, L. et al. (1997) "Network and data security design for telemedicine applications," Medical Informatics, Informatics for Health and Social Care, 22(2):133-142.

Marescaux, J. et al. (2001) "Transatlantic robot-assist telesurgery," Nature, 413(6854):379-380, 710.

Menezes, AJ et al. (1997) Handbook of Applied Cryptography, CRC Press.

Perry, J. and J. Rosen (2006) "Design of a 7 Degree-of-Freedom Upper-Limb Powered Exoskeleton," in Proceedings of the 1st IEEE?RAS EMBS International Conference on Biomedical Robotics and Biomechatronics, pp. 805-810.

Postel, J. (1980) "RFC 768: User Datagram Protocol," ISI, 3 pp.

Roesch, M. (1999) "Snort—Lightweight Intrusion Detection for Networks," in Proceedings of the 13th USENIX Conference on Systems Administration, pp. 229-238.

Rosen, J. and B. Hannaford (2006) "Doc at a distance," IEEE Spectrum, 43(10):34-39.

Rosenberg, J. and H. Schulzrinne (2002) "Session Initiation Protocol (SIP): Locating SIP Servers," Network Working Group, 17 pp.

Rydén, F. et al. (2011) "Proxy Method for Fast Haptic Rendering from Time Varying Point Clouds," in Proceedings of the IEEE/RSJ International Conference on Intelligent Robots and Systems, pp. 2614-2619.

Rydén, F. et al. (2011) "Using KinectTM and a Haptic Interface for Implementation of Real-Time Virtual Fixtures," in Proceedings of the 2nd Workshop on RGB-D: Advanced Reasoning with Depth Cameras (in conjunction with RSS 2011), 5 pp.

Sankaranarayanan, G. et al. (2007) "Portable surgery master station for mobile robotic telesurgery," in Proceedings of the 1st International Conference on Robot Communication and Coordination, pp. 20-28.

Satava, R. (2010) "Future directions in robotic surgery," in Surgical Robotics: Systems Applications and Visions, Springer Verlag, pp. 3-11.

Serpanos, DN and RJ Lipton (2001) "Defense against man-in-the-middle attack in client-server systems," in Proceedings of the 6th IEEE Symposium on Computers and Communications, pp. 9-14.

Smith, SW (1996) "Secure Coprocessing Applications and Research Issues," Los Alamos Unclassified Release LA-UR-96/2805, 17 pp.

Smith, SW et al. (1998) "Using a High-Performance, Programmable Secure Coprocessor," in Financial Cryptography, Springer, pp. 73-89.

Smith, SW and S. Weingart (1999) "Building a high-performance, programmable secure coprocessor," Computer Networks, 31(8):831-860.

Smith, SW and D. Safford (2001) "Practical server privacy with secure coprocessors," IBM Systems Journal, 40 (3):683-695.

Stallings, W. (2003) Cryptography and network security, Prentice Hall, pp. 1-16.

Stinson, DR (2006) Cryptography: Theory and Practice, CRC Press.

(56) References Cited

OTHER PUBLICATIONS

Tadano, K. and K. Kawashima (2007) "Development of a Master Slave System with Force Sensing Using Pneumatic Servo System for Laparoscopic Surgery," in Proceedings of the IEEE International Conference on Robotics and Automation, pp. 947-952.

Tadano, K. and K. Kawashima (2009) "Development of a pneumatically driven forceps manipulator IBIS IV," Proceedings of the ICROS-SICE International Joint Conference, pp. 3815-3818.

Thamilarasu, G. et al. (2005) "A Cross-layer based Intrusion Detection Approach for Wireless Ad hoc Networks," in Proceedings of the IEEE International Conference on Mobile Adhoc and Sensor Systems Conference, pp. 7-15.

Thompson, JM et al. (1999) "Human Factors in Telesurgery: Effects of Time Delay and Asynchrony in Video and Control Feedback with Local Manipulative Assistance," Telemedicine Journal, 5(2):129-137.

Webb, J. and R. Reis (1998) Programmable Logic Controllers: principles and applications, Prentice Hall, pp. 7-9, 47-50.

Wozak, F. et al. (2007) "End-to-end Security in Telemedical Networks—A Practical Guideline," International Journal of Medical Informatics, 76(5):484-490.

Yang, Y. et al. (2003) "Secure an Image-based Simulated Telesurgery System," in Proceedings of the IEEE International Symposium on Circuits and Systems, 2:584-596.

Yee, B. and JD Tygar (1995) "Secure Coprocessors in Electronic Commerce Applications," in Proceedings of the 1st USENIX Workshop on Electronic Commerce, 17 pp.

Yoo, AC et al. (2010) "Military robotic combat casualty extraction and care," in Surgical Robotics: Systems Applications and Visions, Springer Verlag, pp. 13-32.

Zetter, K. (2012) "Meet 'Flame,' The Massive Spy Malware Infiltrating Iranian Computers, [Online] Available at: www.wired.com/threatlevel/2012/05/flame.

\* cited by examiner

US 9,148,443 B2

ENHANCED SECURITY AND SAFETY IN TELEROBOTIC SYSTEMS

CROSS-REFERENCE TO RELATED APPLICATIONS

The present application claims priority to U.S. Provisional Patent Application No. 61/668,590, entitled "Coprocessor for Security Implementation in Telerobotic Systems", filed Jul. 6, 2012, which is entirely incorporated by reference herein for all purposes.

STATEMENT OF GOVERNMENT RIGHTS

This invention was made with government support under grant number CNS-0930930, awarded by the National Science Foundation. The government has certain rights in the invention.

BACKGROUND OF THE INVENTION

Unless otherwise indicated herein, the materials described in this section are not prior art to the claims in this application and are not admitted to be prior art by inclusion in this section.

Advances in robotics, embedded and information systems are enabling a rapid development of tele-operated robotic systems. Some of the applications of such systems include handling radioactive material; operating unmanned vehicles for air (e.g., UAV, drone), space (e.g., near Earth's orbit or a manned platform or vehicle), land, and underwater (e.g., ROV) exploration; and telesurgery. With an increase in possible applications, however, the risk of such systems being misused, deliberately tampered with, or even compromised increases as well. These security threats are especially harmful if tele-operated robotic systems are used for inspection, repair and manipulation, such as in telerobotic surgery systems.

In some embodiments, secure processors are utilized. Secure coprocessors can include dedicated chips, microprocessors or computers, which provide tamper-resistance and enable executing of cryptographic method. Various applications of secure coprocessors have been proposed for use in commercial, military, and electronic voting applications.

SUMMARY

In one aspect, a method is provided. A security device receives a plurality of commands to control a remotely-operable device in a remote environment. At least one command in the plurality of commands includes command data related to the remotely-operable device. The security device receives a plurality of responses to the plurality of commands. The security device processes the plurality of commands and the plurality of responses to determine a signature related to an operator that issued the plurality of commands to control the remotely-operable device. The security device determines an identity of the operator based on the signature. The security device generates an identity report that includes the identity of the operator.

In another aspect, a security device is provided. The security device includes a processor and a non-transitory tangible computer readable medium. The non-transitory tangible computer readable medium is configured to store instructions that, when executed by the processor, cause the security device to perform functions. The functions include: receiving a plurality of commands to control a remotely-operable device in a remote environment, where at least one command in the plurality of commands includes command data related to the remotely-operable device; receiving a plurality of responses to the plurality of commands; processing the plurality of commands and the plurality of responses to determine a signature related to an operator of the remotely-operable device, where the operator issued the plurality of commands; determining an identity of the operator based on the signature, and generating an identity report including the identity of the operator.

In yet another aspect, a method is provided. A security device records a first identity. The security device receives a plurality of commands to control a remotely-operable device in a remote environment. At least one command in the plurality of commands includes command data related to the remotely-operable device. The security device receives a plurality of responses to the plurality of commands. The security device processes the plurality of commands and the plurality of responses to determine a current signature related to a current operator that issued the plurality of commands to control the remotely-operable device. The security device determines a current identity of the current operator based on the current signature. The security device determines whether the first identity is the same as the current identity. After determining that the first identity is not the same as the current identity, the security device performs a first action based on the first identity not being the same as the current identity.

DETAILED DESCRIPTION

Figure 1A:
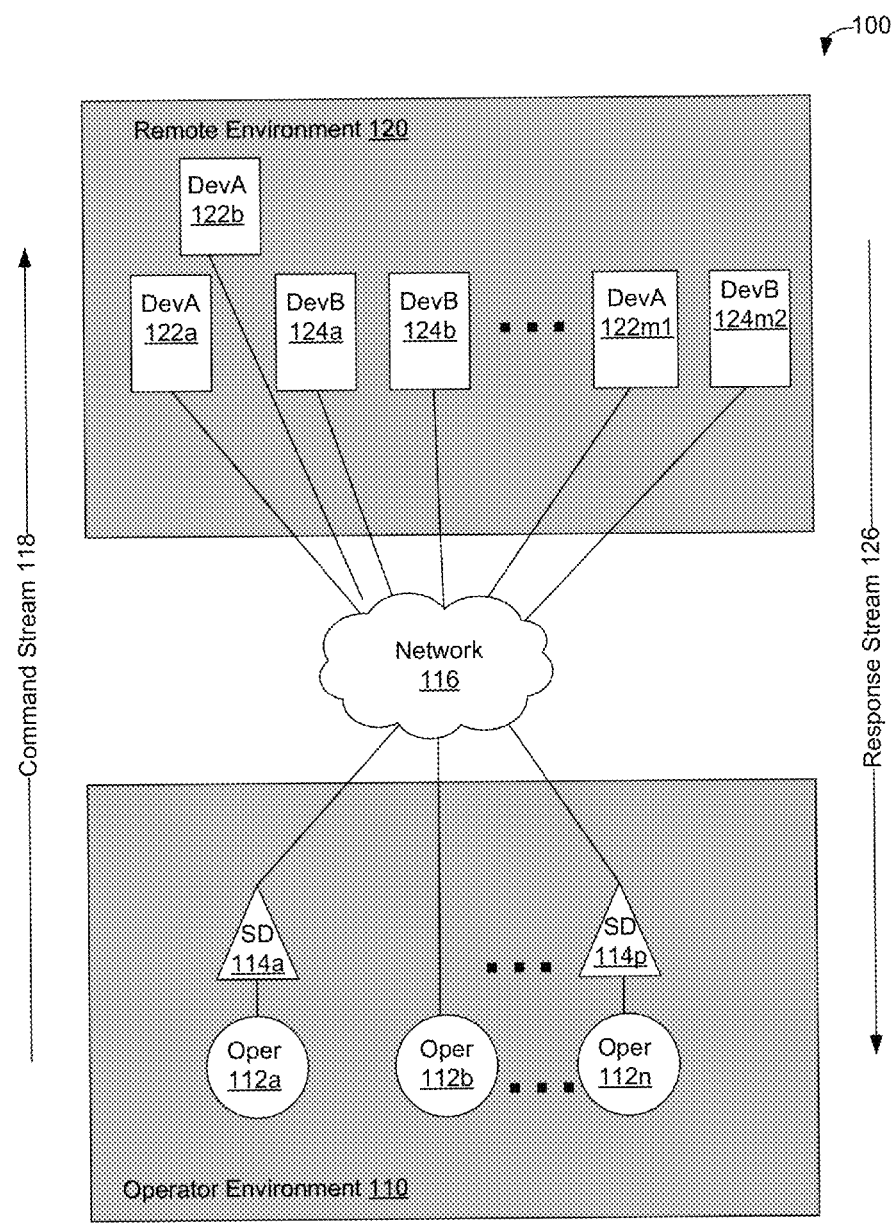
FIGS. 1A, 1B, 1C, and 1D each illustrates an example operating environment for remotely-operated devices, in accordance with an embodiment.

In tele-operated systems, one or more operators can control one or more remote devices through a communication network. For example, in telerobotic surgery systems, one or more distant surgeons control surgical and other medical manipulator(s) through a communication network. Then, surgical procedures can be viewed as an information exchange between a surgeon and a surgical manipulator and the telerobotic surgery system can be seen as an information system.

While the core functionality of this information system remains the same, services can now be delivered across large distances. Application areas for telerobotic surgery systems include, but are not limited to: (i) areas where specialists are unavailable; e.g., rural and underdeveloped remote areas, lacking a specialist on site, (ii) areas of natural disasters, (iii) areas of man-made disasters; e.g., sites of terrorist acts, factory explosions, power-plant fires and (iv) battlefield areas. In these extreme operating environments, telerobotic surgical systems can operate under harsh environmental conditions, such as extreme temperatures, humidity, and excessive amounts of airborne particulates such as dust or smoke. In addition, the application areas may lack basic infrastructure and/or have limited power resources.

A communication network consisting of several wired and wireless components can enable communication for the telerobotic surgical system. In 2007, a Raven surgical manipulator was deployed in the Mojave Desert, and several field experiments were conducted. During this experiment, the following network stochastic conditions were observed: increased communication latency, increased jitter, and additional packet losses, delays, and out-of-order-arrivals.

In addition to stochastic, but benign network patterns, surgeon-manipulator communication over publicly available, or even dedicated wireless networks exposes telerobotic surgery systems to novel set of problem which were not present in hospital settings. For example, the relatively open and uncontrollable nature of communication networks renders telerobotic surgery systems susceptible to attacks mounted by malicious entities (adversaries).

As an example, consider the following telerobotic surgery system: a surgeon controls a remote surgical manipulator deployed in a desert-like, military environment. The communication network between the surgeon and the manipulator consists of multiple wired and wireless components, and the last communication network in the manipulator's direction is a UAV-enabled wireless network. In such a network, an adversary can attempt to jam, disrupt or even take over the communication network between the surgeon and the manipulator, with the intent to harm wounded soldiers and increase human casualties.

Security threats against telerobotic surgery systems can be classified into the following five groups: (1) attacks against wireless communication, (2) attacks on the Internet-enabled surgeon-manipulator interaction, (3) attacks on the surgeon-side software, (4) attacks on the manipulator-side software, and (5) physical attacks. The message exchange between a surgeon and a manipulator in telerobotic surgical systems can be defined using the Interoperable Telesurgery Protocol (ITP), In the ITP, messages are exchanged using the User Datagram Protocol (UDP). UDP is a minimal-latency transport layer protocol, but does not provide a reliable service. Commanded surgical tool motions are, however, made in very small increments, so possible negative effects of the UDP's unreliability can be reduced by transmitting a surgeon's inputs in small increments. In ITP, control messages, force feedback messages, and video feedback messages are unencrypted and unauthenticated. That is, upon receiving the control message, the manipulator cannot verify that it was the surgeon who sent the message.

An adversary within the manipulator's communication range can misuse and disrupt this unencrypted ITP communication channel using different attacks. In an eavesdropping attack, an adversary can passively listen to the communication between one or more surgeon(s) and the manipulator(s). In a jamming attack, the adversary can deliberately introduce noise into a communication channel to increase the communication delay between the surgeon and the manipulator. In some cases, jamming can completely disrupt message exchange and effectively disable the surgical telerobotic system. In a message modification/false data injection attack, the adversary can modify transmitted messages and/or inject false messages to destabilize the manipulator. By spoofing surgeon control inputs, the adversary may cause the manipulator to move in an undesired and unsafe direction.

For example, consider a jamming attack against the Raven portable surgical manipulator, where an emergency state is entered if the Raven does not move within a specified time; e.g., 500 ms. First, the surgeon can send a valid control command to the Raven. The Raven can receive and perform the valid control command and send a force feedback message to the surgeon. The surgeon, upon receiving the force feedback, can generate a second control message and send the second control message to the Raven. The second message is, however, corrupted by the jamming signal, and so the Raven cannot carry out the second control message. Later, a new incremental movement message is sent to the Raven, but this message is again corrupted by the jamming signal. Since all received messages are corrupted by the jamming signal, the Raven is unable to move for more than 500 ms, and so enters an emergency state.

Additionally, lack of authentication between a surgeon and a surgical manipulator can leave surgical tele-operation sessions vulnerable to man-in-the-middle (MITM) attacks, where an adversary: (1) blocks valid messages between a surgeon and a manipulator and (2) creates independent connections with both entities. With a successful MITM attack, the adversary gains control over the procedure, while making the surgeon and the manipulator believe they are talking to each other. As such, MITM attacks are especially malicious, since the adversary may exploit different properties of telerobotic surgery systems to mount them. Moreover, the MITM adversary becomes a part of the system, and can completely compromise the system.

In order of increasing level of impact, the following types of the MITM attack are possible: (1) a delay attack, where the adversary delays received messages for some chosen amount of time before forwarding them to the intended recipient, (2) a replay attack, where an adversary receives messages and replays them to the recipient, (3) message dropping attack, where the adversary simply drops some or all of the received messages, (4) combined delay and message dropping attacks, where the adversary randomly delays some, and drops other messages, possibly in both directions, and (5) message modification/spoofing attacks, where an adversary modifies received messages, and/or creates "spoofed" or false messages in order to render the procedure unsafe.

For example, consider a message spoofing MITM attack where the adversary allows transmission of control messages, but spoofs feedback messages. In this attack, the adversary receives a control message from the surgeon, and forwards the control message to the Raven. The Raven carries out the control message and generates a force feedback message in response that informs the surgeon of its current position. The adversary can then block the valid feedback message and instead send a spoofed feedback message to the surgeon with an incorrect location. The surgeon accepts the spoofed message as valid and commands a new move to change the Raven's current position as indicated in the spoofed feedback message. The adversary forwards the control message with the new move, which is then carried out by the Raven. The adversary again blocks the valid force feedback message, and instead sends another spoofed feedback message to the surgeon, with another incorrect location. Then, the surgeon again commands another move to the manipulator to correct the manipulator's current position, which is specified as incorrect in the feedback message. At this point, after implementing the received message, the Raven may exit an allowed operating area, and enter into an invalid, or even harmful, area of an operating environment.

In order to have patient-safe telerobotic surgical systems, in other words, systems where a patient's well-being and safety can be established, maintained and guaranteed through the whole procedure, despite harsh operating conditions and hostile environments, tele-operated surgery systems need security. It has been argued by many security experts that complex systems are secured best when security solutions are incorporated in the system design from the start.

A security device for remotely operating devices can generate "signatures" or patterns of use of the remote device. During operation of the remote device, a signature of commands issued by a given operator and/or responses to the commands can be generated by a signature generator. The commands and/or responses can be validated prior to signature generation; e.g., inspected for correct formatting, comparing source/destination addresses with active operators and devices, etc. The generated signature can be compared to a number of existing authorized signatures with associated identities. If a match is found between the generated signature and an existing signature, an identity of the matching existing authorized signature can be assigned to the given operator, and the given operator can be considered to be authorized. If no match is found, the given operator can be considered to be unauthorized.

The signature generator can be a portion of or the entire security device, where the security device is configured to operate with and/or be part of a device sending commands to a remotely-operated device, a network connecting the device sending commands and the remotely-operated device, and/or the remotely-operated device. That is, the security device can be part of some or all of the components of a tele-operated system, such as but not limited to, a telerobotic surgery system.

In some embodiments, the signature generator and/or security device are implemented using a secure coprocessor. The secure coprocessor can be configured to carry out security methods, such as signature generation, that can run in parallel with regular manipulator computations. Thus, a dedicated secure coprocessor can add security to tele-operated systems without adding communication delay, as security algorithms can use the dedicated security coprocessor and so need not use general-purpose computation resources. In some embodiments, secure coprocessor(s) can provide security algorithms operable on video feedback.

Experimental data has been captured while several operators each performed a specific task. The captured data can be stored for use as signatures for each of the operators regarding the specific task. Then, at a later date, when an operator performs the specific task, subsequent data can be captured during performance of the later specific task. The subsequent data can be compared with the stored to either determine a match between the subsequent data and stored data for one operator, thereby indicating an identity of an operator associated with the stored data is the identity of the operator performing the later specific task. If no match is found between the subsequent data and stored data for all operators, then an anomaly report can be generated to indicate the operator is unidentified, and perhaps an invalid or unauthorized operator. In situations where attacks on the remote procedure are possible, the anomaly report can indicate that a system performing the remote procedure can be under attack. Comparing data captured from two different operators performing the same task for less than seven seconds shows identifiable differences in the captured data.

Also, similar techniques used for identifying operators of remote devices can be used to observe data about specific devices and to therefore identify specific devices. For example, suppose one operator O1 performed a task T1 using three different devices D1, D2, and D3. Data obtained while O1 performs T1 using D1, D2, and D3 can be stored and compared to obtain differences between the devices D1, D2, and D3. Note that the per-device data may have to account for variation for performance of the task T1 using each of devices D1, D2, and D3. In some cases, a robot or other machine can act as the operator while trying to obtain device-specific differences, so to minimize variations in performance of T1 and/or to repeat performance of T1 multiple times on each device D1, D2, and D3.

Using signatures of operations can provide rapid determination of either an authorized or unauthorized operator performing a task. Also, by continuously obtaining data throughout task performance and comparing the obtained data to stored data for valid operators can lead to quick identification of changes in operators. Further, continuously obtaining and comparing data throughout task performance can lead to rapid detection of attacks on the system, such as but not limited to delay attacks and MITM attack. These detection techniques do not require any additional data be provided in the command and/or response data; rather, the obtained data can be obtained from the command and/or response data without alteration. Additionally, signature-based detection can be used to identify devices as well as operators.

Example Environments for Operating Remote Devices

FIGS. 1A, 1B, 1C, and 1D each illustrate an example operating environment 100 for remotely-operated devices, in accordance with an embodiment. FIG. 1A illustrates operating environment 100 with operator environment 110 connected to remote environment 120 using network 116. Operator environment 110 can have one or more operators for controlling remotely-operable devices in remote environment 120. FIG. 1A shows n operators 112a, 112b, ... 112n, n>0, in operator environment 110, where each of the n operators 112a, 112b, ... 112n can utilize an operator device to send commands, such as commands in command stream 118, to device(s) in remote environment 120. In FIG. 1A, each operator 112a, 112b ... 112n utilizes one operator device (for a total of n operator devices), and each operator device is the same. In other examples, some or all of the operators in operator environment 110 can use different types of operator devices and/or more, fewer, or different numbers of operators and/or operator devices can be utilized; e.g., each operator can use more than one operator device or more than one operator can utilize an operator device.

FIG. 1A shows that, in example remote environment 120, two types of remote devices are utilized: type "DevA" and type "DevB". In other examples, more, fewer, or different types of remote devices can be utilized. FIG. 1A also shows that there are m1 devices of type "DevA", numbered 122a, 122b, ... 122m1, and m2 devices of type "DevB", numbered 124a, 124b, ... 124m2. In other examples, more, fewer, or different types of remote devices can be utilized and/or more, fewer, or different numbers of each type of remote device can be utilized than shown in FIG. 1A. In still other examples, more than one network can be used to connect operator environment 110 with remote environment; e.g., one network for the "DevA" devices and another network for the "DevB" devices; different networks for different geographical regions of operator environment 110 and/or different geographical regions of remote environment 120.

After carrying out one or more commands, the device(s) in remote environment can generate one or more responses and send the response(s) in response stream 126. Each of the operator device(s) in operator environment 110 can examine response stream 126 for responses from the specific device(s) associated with the operator device.

After receiving the responses from the specific device(s) associated with the operator device in response stream 126, the operator device can provide feedback to the operator. The feedback can include, but is not limited to, visual feedback, auditory feedback, haptic (touch-based) feedback, and/or combinations of visual, auditory, and haptic feedback. Each operator device in operator environment 110 and each device in remote environment 120 can be and/or include a computing device, such as discussed below in more detail in the context of at least FIG. 4B.

In some examples, part or all of the communication between operating environment 110 and remote environment 120 can be secured. FIG. 1A shows p security devices (SDs) 114a . . . 114p in operating environment 110, where security devices 114a, 114 are respectively configured to secure communications between operators 112a, 112n and remote environment 120. In the example shown in FIG. 1A, communications between operator 112b and remote environment are not secured by a security device; as such, these communications may be unsecured. In other examples, security device 114 can be part of an operator device, network 116, and/or a remote device. In still other examples, such as shown in FIG. 1A, security device 114a, 114n, can be a separate device from either an operator device, network 116, or a remote device. For example, security device 114a can be a plug-and-play type device; e.g., a dongle or other device connected to an operator device with a Universal Serial Bus (USB) or similar cable, a card operating according to IEEE 1394 (e.g., a PCM-CIA card), or other removable device connected to the operator device for operator 112a.

In some examples, operator environment 110 and remote environment 120 can overlap or be the same. For example, a remote device can be configured to carry the operator into the remote environment; e.g., the remote device can be an underwater submersible, a space device, or a walking robot. As another example, the operator environment 110 and remote environment 120 may be separated by a small physical space; e.g., a wall of a lab, power plant, or hazardous environment. Many other examples of operator devices, operators, operating environments, networks, remote devices, and remote environments are possible than described herein.

Figure 1B:
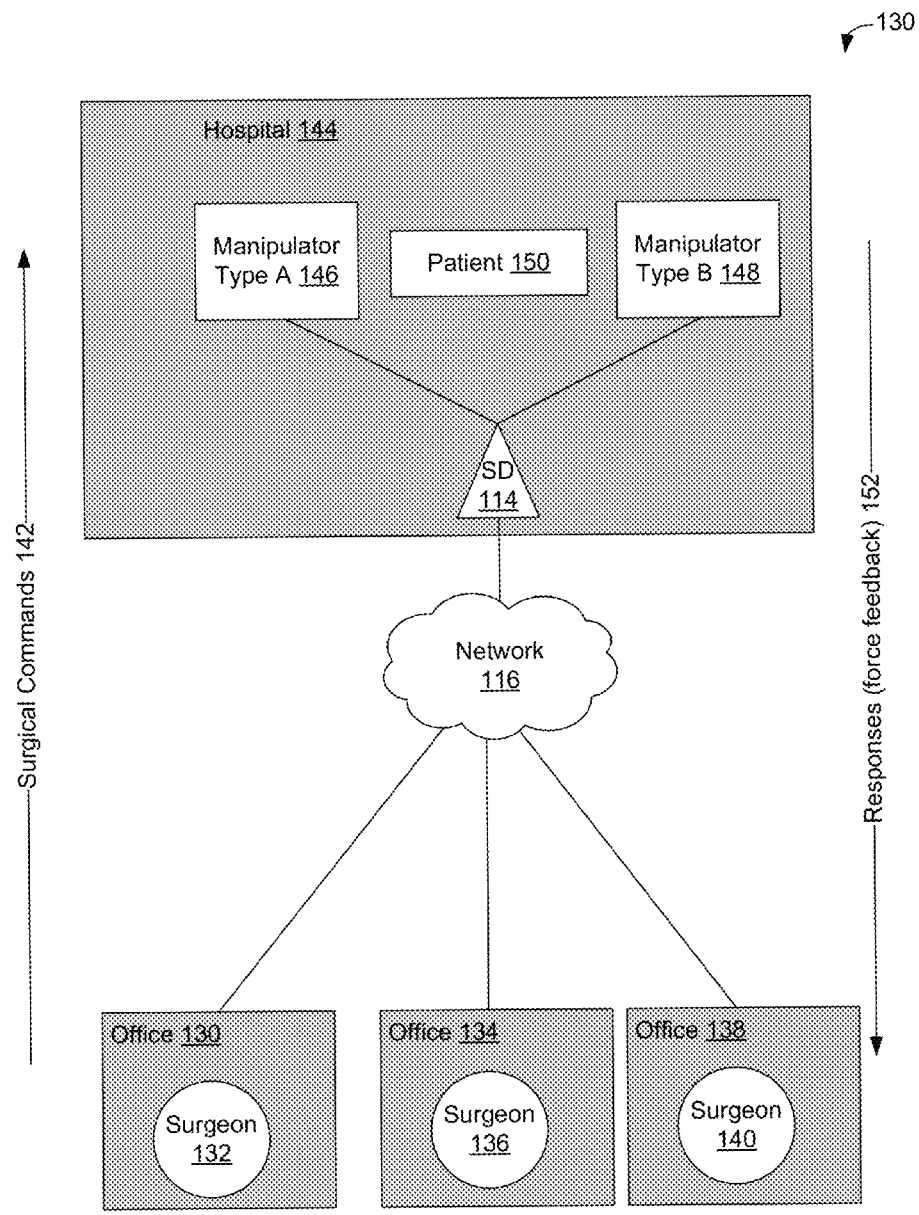

FIG. 1B illustrates operating environment 130 with offices 130, 134, 138 making up the operator environment connected to remote hospital 144 using network 116. For example, surgeons 132, 136, and 140 can remotely operate on patient 150 in hospital 144 using surgical manipulators 146, 148. FIG. 1B shows two types of surgical manipulators: type A 146, and type B 148. In some examples, one type of surgical manipulator can be used in an remote operation; in other examples, more than two types of surgical manipulators can be used in an remote operation; and in even other examples, remotely-operable devices other than surgical manipulators can be used in an remote operation; e.g., lighting devices, anesthetic equipment, diagnostic equipment, etc. In still other examples, medical procedures other than operations can be performed remotely; e.g., diagnoses, examinations, observations.

Each respective office 130, 134, 138 has a respective surgeon 132, 136, 140 having one or more operator devices for controlling manipulators 146, 148 in hospital 144. Each operator device can send surgical commands 142 via network 116 and security device 114 in hospital 144 to manipulators 146 and/or 148. In response to surgical commands 142, manipulators 146, 148 can send responses 152 to surgeons 132, 136, and/or 140 via security device 114 and network 116. Responses 152 can include, but are not limited to feedback to surgeons 132, 136, and/or 140; e.g., visual feedback, auditory feedback, haptic (touch-based) feedback, and/or combinations of visual, auditory, and haptic feedback.

Figure 1C:
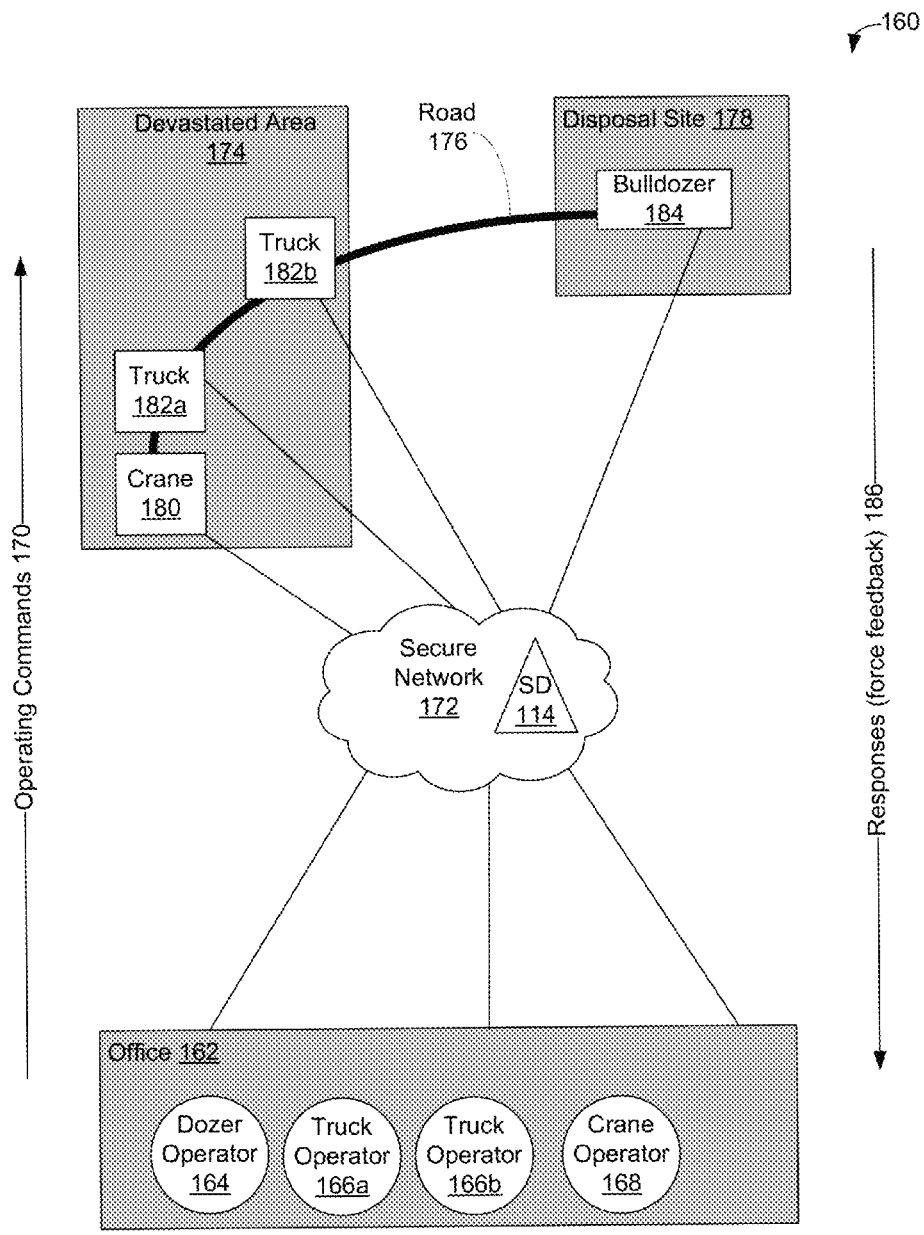

FIG. 1C illustrates operating environment 160 with office 162 acting as the operator environment connected to remote devastated area 174, road 176, and disposal site 178 using network 172. Office 162 has four operators controlling respective remote operator devices: bulldozer (dozer, for short) operator 164 for operating remote bulldozer 184, truck operators 166a, 166b for operating respective remote trucks 182a, 182b, and crane operator 168 for operating crane 180.

The four operators and associated operator devices can restore devastated area 174 by providing commands for loading materials into trucks 182a, 182b using crane 180 and carrying the materials away from devastated area 174 on road 176 to disposal site 178. In some examples, one or two types of equipment can be used in construction operation, such as, but not limited to, restoring a devastated area, hazardous waste cleanup, landmine detection and removal, undersea building, remote construction, etc. In other examples, more than three types of equipment can be used in a remote construction operation; and in even other examples, remotely-operable devices other than construction equipment, such as cranes, trucks, and bulldozers, can be used in an remote construction operation; e.g., demolition equipment, welding, fabrication and assembly equipment, test equipment, etc.

Each operator device operated in office 162 can send operating commands 170 via secure network 172. Secure network 172 can include one or more security devices 114 configured for securing communications between office 162, devastated area 174, road 176, and disposal site 178, such as but not limited to communications including operating commands 170 and/or responses 186. For example, suppose bulldozer operator 164 is utilizing an operating device configured for voice communications to disposal site 178. In this example, secure network 172 and/or security device 114 can be configured to encrypt or otherwise secure voice communications between office 162 and disposal site 178.

In response to operating commands 142, crane 180, trucks 182a, 182b, and/or bulldozer 184 can send responses 186. Responses 186 can include, but are not limited to feedback to operators 164, 166a, 166b, and/or 168; e.g., visual feedback, auditory feedback, haptic (touch-based) feedback, and/or combinations of visual, auditory, and haptic feedback.

Figure 1D:
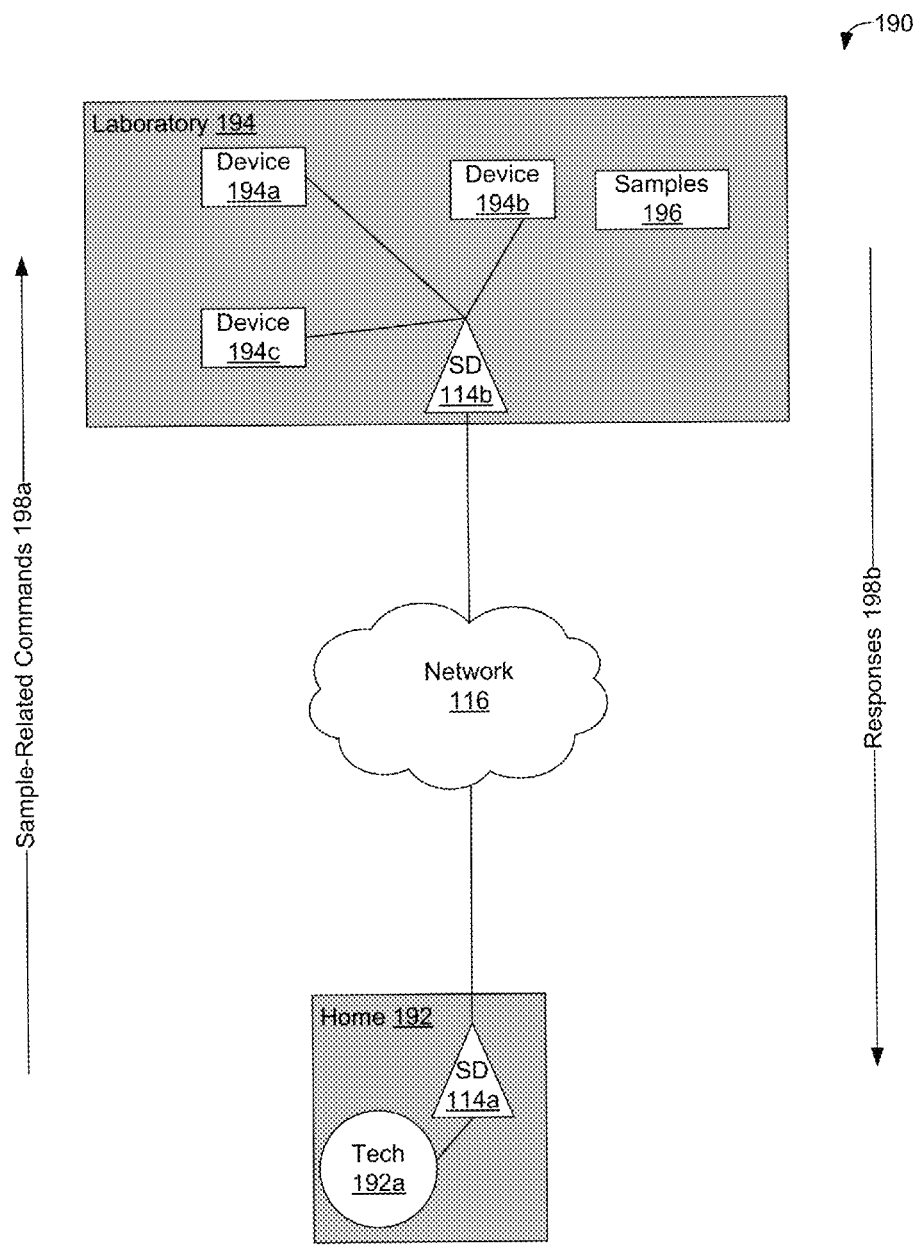

FIG. 1D illustrates operating environment 190 with home 192 as the operator environment connected to remote laboratory 194 using network 116. For example, technician (tech for short) 192a can remotely perform experiments on samples 196 in laboratory 194 using remote devices 194a, 194b, 196c. In some examples, more or fewer than three devices can be used for remote laboratory experiments. In other examples, other procedures than experiments can be performed remotely; e.g., testing, observation, etc.

Home 192 includes technician 192a with one or more operator devices for controlling devices 194a, 194b, and 194c. Each operator device can send sample-related commands 198a via security device 114a in home 192, network 116, and security device 114b in laboratory 194 to devices 194a, 194b, and/or 194c. In response to sample-related commands 198a, devices 194a, 194b, 194c, can send responses 198b to an operating device utilized by technician 192a via security device 114b, network 116, and security device 114a. Responses 198b can include, but are not limited to feedback to technician 192a; e.g., visual feedback, auditory feedback, haptic (touch-based) feedback, and/or combinations of visual, auditory, and haptic feedback.

Example Security Device Operating Scenario

Figure 2:
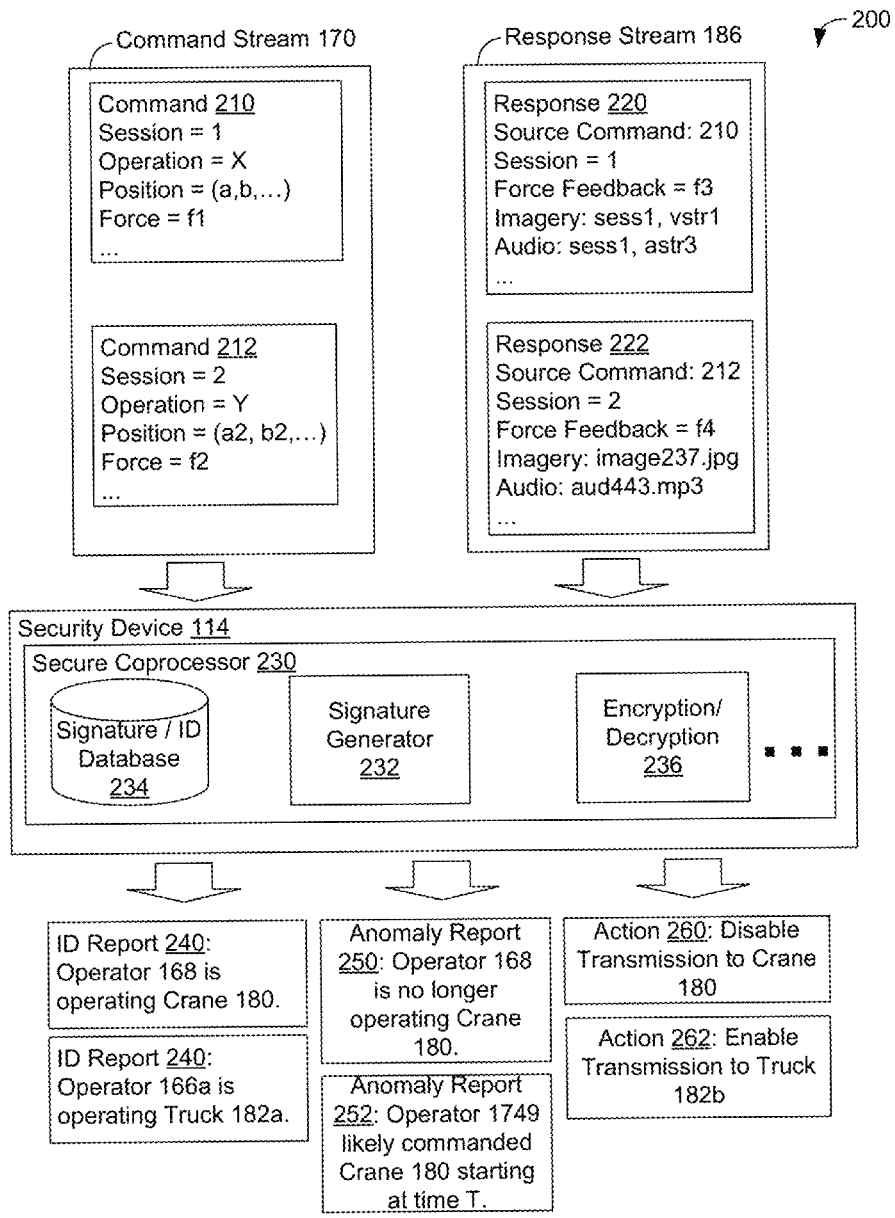
FIG. 2 illustrates an example scenario for operating a security device, in accordance with an embodiment.

FIG. 2 illustrates example scenario 200 for operating security device 114 in operating environment 160 shown in FIG. 1C, in accordance with an embodiment. Scenario 200 begins with at security device 114 receiving at least two inputs— command stream 170 and response stream 186. FIG. 2 shows two example commands in command stream 170: command 210 for an operating session "1" to perform an operation of "X" at position "(a, b, ...)" with force "f1" and command 212 for an operating session "2" to perform an operation of "Y" at position "(a2, b2, ...)" with force "f2". In other scenarios, more, different and/or fewer commands can be part of command stream 170 and/or more, different, and/or fewer data items can be provided as part of a command in command stream 170.

In scenario 200, operating session 1 is between crane operator 168 and crane 180 and operating session 2 is between truck operator 166a and truck 182a. Specification of one or more operator identifiers and one or more remotely-operable device identifiers can be determined from the operator(s) and remotely-operable device(s) associated with the session number. In other scenarios, operator identifier(s) and/or remotely-operable device identifiers can be specified directly as part of commands in command stream 170 and/or responses in response stream 186.

FIG. 2 shows two example responses in response stream 186: responses 220 and 222. Response 220 to command 210 in operating session "1" includes a force feedback with a force "f3", related imagery provided on a video stream "vstr1" for session 1 ("sess1" as shown in FIG. 2), and related audio provided on an audio stream "astr3" for session 1. Response 222 to command 212 in operating session "2" includes a force feedback with a force "f4", related imagery as a file entitled "image237.jpg", and related audio provided on as a file "aud443.mp3". In other scenarios, more, different and/or fewer responses can be part of response stream 186 and/or more, different, and/or fewer data items can be provided as part of a response in response stream 186.

In scenario 200, commands from command stream 170 and responses from response stream 186 can be provided as inputs to security device 114 of secure network 172. Security device 114 can include secure coprocessor 230 to provide processor(s) (e.g., central processing units (CPUs), graphics processing units (GPUs), math coprocessors, etc.), security-specific hardware (e.g., application-specific integrated circuits (ASICs), other circuits including other integrated circuits), memory, interconnection devices (e.g., buses), firmware, and/or software for security-related processing.

Examples of security-related processing include, but are not limited to, signature generator 232 and encryption/decryption device 236. Signature generator 232 can determine or generate a signature for an operator of a remotely-operable device based on commands input from command stream 170, responses input from response stream 186, and/or other inputs (e.g., timing data, remotely-operable device schedules, etc.). Signature generation is described in more detail in at least FIG. 3 below.

Signatures and associated identities (IDs) can be stored in signature/ID database 234. For example, signature/ID database 234 can receive a query with a given ID, retrieve a stored signature associated with the given ID, and provide a query response with the given ID. As another example, signature/ID database 234 can receive another query with a given signature, retrieve a stored ID associated with the given signature, and provide a query response with the stored ID. If, in after receiving a particular query for an ID or signature, no matching signature or ID, the query response can indicate that no matching data is available. In some scenarios, signature/ID database 234 can receive other queries, retrieve other data based on the other queries, and provide query reports based on the retrieved other data.

In combination, signature generator 232 can generate a signature from commands, response, and other inputs as discussed immediately above, form a query with the generated signature to signature/ID database 234, and receive a query response from signature/ID database 234 with an ID associated with the generated signature.

Then, signature generator 232 can generate reports and/or take action(s) based on the information, such as, but not limited to, ID reports, anomaly reports, and actions as shown in FIG. 2. Example ID report 240, as shown in FIG. 2, indicates that a signature of "Operator 168" has been generated and matched with an ID for "Operator 168" who is operating "Crane 180." Example anomaly report 250, shown in FIG. 2, indicates that a signature has been generated for remotely-operable device "Crane 180" that does not match the signature of "Operator 168", and so anomaly report 250 indicates that operator 168 is no longer operating crane 180. Example anomaly report 252 indicates that a signature has been generated for remotely-operable device "Crane 180" at a time "T" that generally matches a signature of "Operator 1749", and so anomaly report 252 indicates that operator 1749 likely took control of crane 180 starting at time T.

Example actions that can be taken by signature generator 232 can include, but are not limited to, inhibiting transmission of one or more commands from one or more operator devices and/or to one or more specified remotely-operable devices, enabling transmission of one or more commands from one or more operator devices and/or to one or more specified remotely-operable devices, inhibiting transmission of one or more responses from one or more specified remotely-operable devices and/or to one or more operator devices, enabling transmission of one or more responses from one or more specified remotely-operable devices and/or to one or more operator devices, requesting additional information about an operator (e.g., request the operator generate a command with a name, personal ID number (PIN), biometric information, etc.), requesting retransmission of commands and/or responses, sending command(s) to start or stop one or more specified remotely-operable devices, and sending command(s) to start or stop one or more specified operator devices. FIG. 2 shows two example actions—action 260 to disable transmission of commands to crane 180 and action 262 to enable transmission of commands to truck 182b. Many other reports and actions are possible as well.

Signature Detection and Generation for Secure Operation of Remote Devices

In one experiment, 14 types of tool/tissue interactions were defined and associated each interaction type with a unique surgeon's force/torque signature. Experimental data was obtained from 10 surgeons (subjects) who each performed a laparoscopic cholecystectomy. Using the experimental data, a Hidden Markov Model (HMM) was trained for each subject and each step of the procedure.

The obtained HMMs found discrepancies between expert and novice surgeons, and a statistically significant difference between two groups of surgeons was observed. In particular, the major differences between skill levels were observed in: (a) force/torque amplitudes, (b) types of tool/tissue interactions used, and transitions between them, (c) time spent in each tool/tissue interaction, and (d) the overall procedure time. This experiment suggests that every operator has a unique operator signature, or way of communicating with and controlling a remote device.

An extended set of operator's and remote manipulator's features can be used to generate the operator signature for a given operator. Techniques using the operator signature can detect possible system anomalies in real-time, such as unauthorized, jammed or spoofed operators. For example, operator behavior or another part of a tele-operated system can be analyzed. Example aspects of operator behavior that make up the operator signature include, but are not limited to, the amount of force applied to command tools, time spent on specific step(s) of a remote procedure, and the overall time to perform the procedure.

An example approach analyzing and validating operator's performance during a tele-operated remote procedure can include:

1) Choosing and developing a mathematical model of an operator. Example mathematical models include: linear and nonlinear dynamical models; statistical models, such as single- and multiple-step Markov models, Hidden Markov models, Bayesian networks, semi-Markov models, wavelet representations of signature, empirical mode decomposition representations of signatures, and Gaussian models; algorithmic models; and graphical models.

2) At the beginning of a remote procedure, record the first batch of measurable data on the operator and the manipulator sides, as well as messages exchanged between the operator and the manipulator. Similar to a person's handwritten signature, where many people may write a single letter in a similar or even identical way, looking at a single letter or a single parameter may not be enough to extract an operator's unique signature. Just as handwriting differs from person to person, a specific combination of measurable parameters, representing the way an operator interacts with a remote device, can be determined that enable extraction of the operator's unique signature.

In addition to exchanged messages, measured parameters may include: (a) position, velocity, acceleration and orientation of the operator's tools, (b) position, velocity, acceleration and orientation of the remote device's end effectors, (c) forces and torques applied by the operator, (d) forces and torques applied by the remote device on the surrounding environment, (f) time differences between two consecutive control messages, (g) time differences between two consecutive feedback messages, and/or (h) the overall procedure time.

3) Use the recorded batch of data to extract operator's unique features (parameters of the mathematical model). A variety of feature extraction and model training methods can be used to develop an operator's mathematical model (operator's signature), including system identification, statistical and machine learning methods. The appropriate choice of a method can depend on: the type of a remote procedure, the type of a chosen mathematical model, and the available measured data. A reliable feature extraction and model training method can ensure: (a) that a single set of measured parameters corresponds to one and only one operator's signature, (b) that two sets of parameters measured from two operators do not correspond to only one operator's signature, and (c) that, once signatures for all operators authorized to use the tele-operated system have been generated, each subsequent set of measured parameters matches an authorized operator's signature or generates an anomaly report.

4) Based on the developed mathematical model and the extracted set of features, identify the operator. Considering the proposed operator analysis and validation approach, a shorter validation time interval enables a quicker detection of possible benign and malicious anomalies in a remote procedure. On the other hand, a short time interval requires faster data collection and faster data analysis, which may impact validation reliability. There can be a tradeoff between the length of the validation time interval and the reliability of validation. Choosing an appropriate validation time interval will therefore depend on the type of remote procedure and the perceived risk that the procedure may get compromised.

5) Validate the identified operator. For example, at each time interval, where the length of the time interval is determined based on the type of remote procedure: the expected output of the operator's mathematical model can be predicted. The predicted output will typically include the measurable data on the operator side and the messages sent by the operator. Next, data can be observed; i.e., the security device can measure, record, and/or store data about the operator, messages between the operator and manipulator, and data about the manipulator. The observed data can be compared with the predicted data. If the observed and the measured data align within a given threshold amount, declare that the operator is valid; otherwise, report an anomaly in the remote procedure.

In a recent experiment, ten surgeons performed three series of rocking pegboard robotic surgery training tasks. In this training task, the surgeons moved a pair of elastomeric rings with a specified sequence of pegs and tool movements around a pegboard mounted on a chemistry rocker undulating at a rate of eight cycles per second.

SurgTrak, a custom-developed system for recording surgical performance, was used to obtain and record data about a position and an orientation of a left tool and a right tool for each surgeon, as well as a pose of a tool graspers were recorded during each of the training task sessions. Based on the available recorded data, velocities and angular velocities were computed for each of the tools and the tool grasper for each surgeon. The computed velocities were then used for model development and surgeon's performance validation. Overall, fourteen dimensions of data were considered for analysis.

Experimental data was recorded at a frequency of 30 Hz, resulting in more than 240000 14-dimensional data points for conducted experiments. In order to allow for easier modeling and performance validation, the original experimental data was clustered into 70 distinct clusters using a Vector Quantization (VQ) method (K-means algorithm) to reduce each 14-dimensional data point to a one-dimensional data point. This clustering technique preserves information about each surgeon's performance, so that no two surgeons have the same (or sufficiently similar) clustered output as every surgeon's unique and distinct features are maintained over all trials.

In performing repeated trials, each surgeon has a distinct sequence of actions over all trials and over multiple considered time intervals. Similar results were observed when comparing performance of all surgeons on longer time intervals. Therefore, the chosen clustering techniques maintain a high enough inter-surgeon variability. Also, the observed variability over different trials for the same surgeon is smaller than the variability between different surgeons. In addition, the variability between different trials seems to decrease as time progresses.

Figure 3:
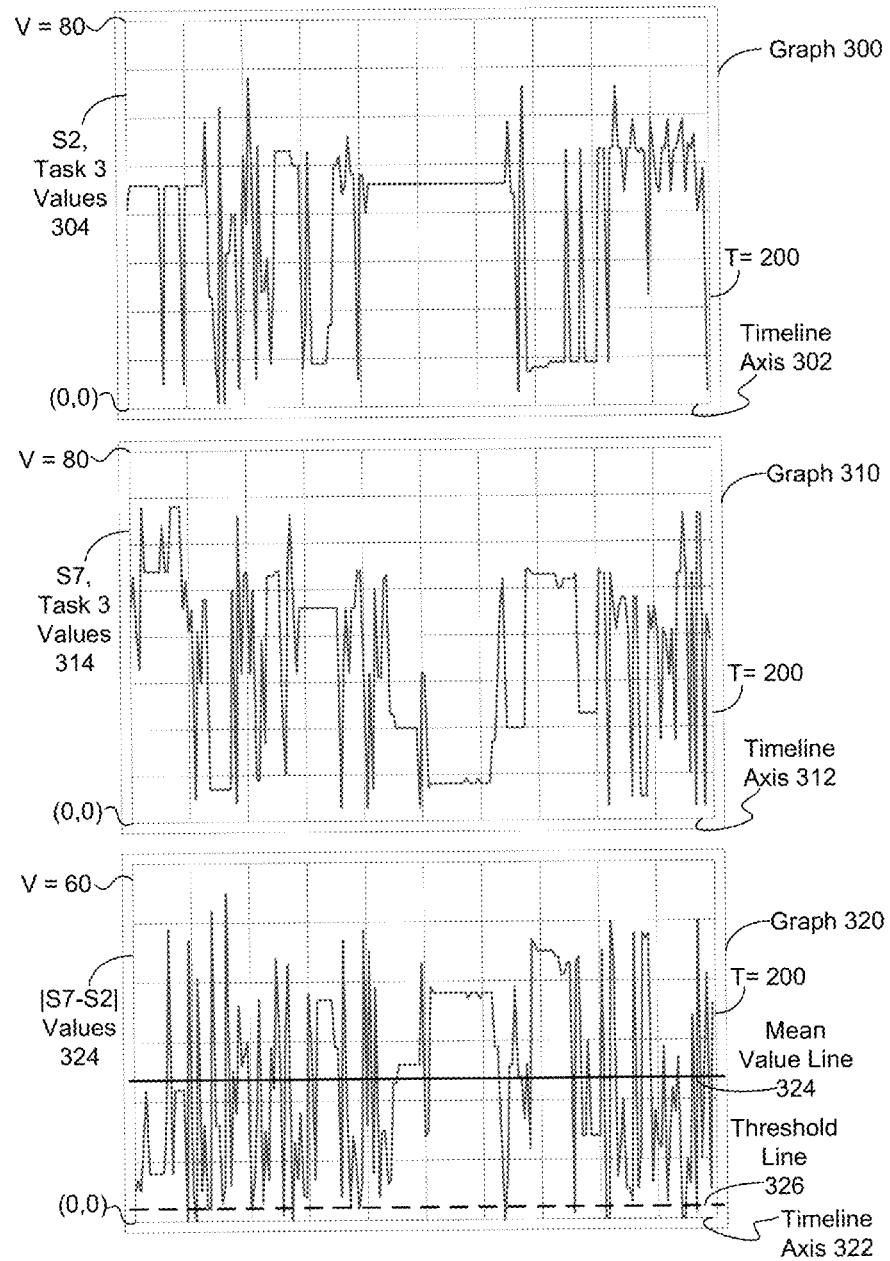
FIG. 3 includes three graphs of data related to operators performing an example remote task, in accordance with an embodiment.

FIG. 3 shows three example graphs of data related to this experiment. Graph 300 has an X (or horizontal) timeline axis 302 with time (T) ranging from T=0 to T=200, and Y (or vertical) axis 304 with clustered values (V) for surgeon 2 (S2) ranging from V=0 to V=80 obtained while surgeon 2 performed a third task "Task 3" during the above-mentioned surgical operation experiment. Graph 310 has an X axis 312 for times T=0 to T=200, and Y axis 314 for clustered values for surgeon 7 (S7) ranging from V=0 to V=80 also obtained while surgeon 7 performed Task 3 during the above-mentioned surgical operation experiment.

The shapes of graphs 300 and 310 can be used as partial or complete signatures for surgeons 2 and 7, respectively. To quantitatively show the differences between the signature of surgeon 2, as represented in graph 300, and the signature of surgeon 7, as represented in graph 310, the absolute values of the differences for the clustered values was determined and plotted as graph 320. Graph 320 has an X axis 322 for times T=0 to T=200, and Y axis 324 for clustered difference values |S2-S7| ranging from V=0 to V=60. A mean difference value of 23.63 was determined over this interval, and is shown on graph 320 as mean value line 324. In comparison, an example threshold value V=2 is depicted on graph 320 as threshold line 326.

For example, suppose that surgeon 2 is an authorized surgeon with the clustered data for graph 300 associated with surgeon 2's identification and an indication that the data is for Task 3. Then, if Task 3 is later performed and clustered data is obtained corresponding to graph 310, the received clustered data can be compared to the stored data for authorized surgeon 2. A comparison value can be generated; e.g., by performing the difference and mean calculations described above in the context of graph 320, where the mean difference value can be used as the comparison value. The comparison value can be compared to a threshold value, and if the comparison value exceeds the threshold value, then the observed data can be determined not to have come from authorized surgeon 2. Recall that the capture rate for the clustered data was 30 Hz, so 200 timesteps take place in 200/30=6⅔ seconds. Therefore, by capturing data for a relatively short time period, a signature can be obtained and used to determine whether or not it matches with authorized signature(s) to determine if an authorized operator is performing a task.

Other comparison and difference techniques can be used beyond those described above in the context of graph 320. For example, as a particular operator is observed performing a repetitive task, data can be obtained over time and ranges of observed values can be determined for various portions of the task, or for the entire task; e.g., for a relatively short task. Then, when the task is later performed, data such as the above-described clustered data can be obtained for the task and compared to see if the data falls into the ranges of observed data for each authorized operator during (portions of) the task. The thresholds can be based on the ranges of observed data values; e.g., if an operator O1 has a mean clustered value of M1 with a range of $\pm\Delta1$ for portion P1 of task T1, and a mean clustered value of $M1+3*\Delta1$ is observed (or, similarly $M1-3*\Delta1$) for P1 of T1, then O1 did not perform P1. However, if the mean observed clustered value is $M1+0.2*\Delta1$, then operator O1 may have performed P1. Then, by observing ranges of mean values over portions of a task, an operator can be identified while storing less data than storing clustered values for the entire task. Tracking observed ranges of performance explicitly allows for operator variability on a per-task basis. Other techniques, data, statistics, and data values can be used in performing comparisons of signatures.

An Example Computing Network

Figure 4A:
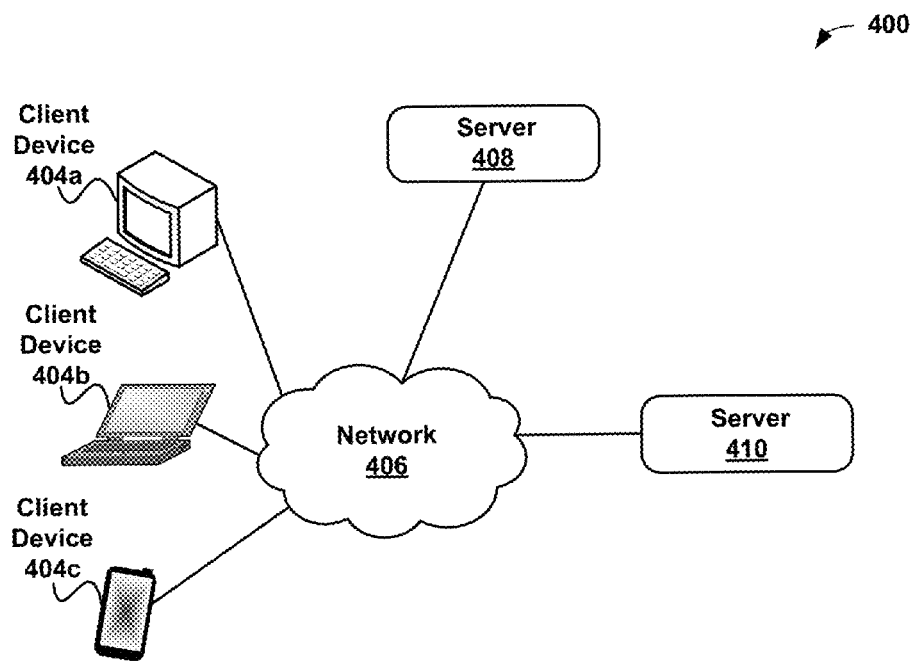
FIG. 4A is a block diagram of an example computing network, in accordance with an embodiment.

FIG. 4A is a block diagram of example computing network 400 in accordance with an example embodiment. In FIG. 4A, servers 408 and 410 are configured to communicate, via a network 406, with client devices 404a, 404b, and 404c. As shown in FIG. 4A, client devices can include a personal computer 404a, a laptop computer 404b, and a smart-phone 404c. More generally, client devices 404a-404c (or any additional client devices) can be any sort of computing device, such as a workstation, network terminal, desktop computer, laptop computer, wireless communication device (e.g., a cell phone or smart phone), and so on.

The network 406 can correspond to a local area network, a wide area network, a corporate intranet, the public Internet, combinations thereof, or any other type of network(s) configured to provide communication between networked computing devices. In some embodiments, part or all of the communication between networked computing devices can be secured.

For example, network 116 and/or secure network 172 can be embodiments of network 406. As such, network 406 can be used to connect remotely-operable devices in one or more remote environments with operator devices in one or more operator environments, such as, but not limited to, the remote environments and operator environments shown in FIGS. 1A-1D.

Servers 408 and 410 can share content and/or provide content to client devices 404a-404c. As shown in FIG. 4A, servers 408 and 410 are not physically at the same location. Alternatively, recipe servers 408 and 410 can be co-located, and/or can be accessible via a network separate from network 406. Although FIG. 4A shows three client devices and two servers, network 406 can service more or fewer than three client devices and/or more or fewer than two servers.

An Example Computing Device

Figure 4B:
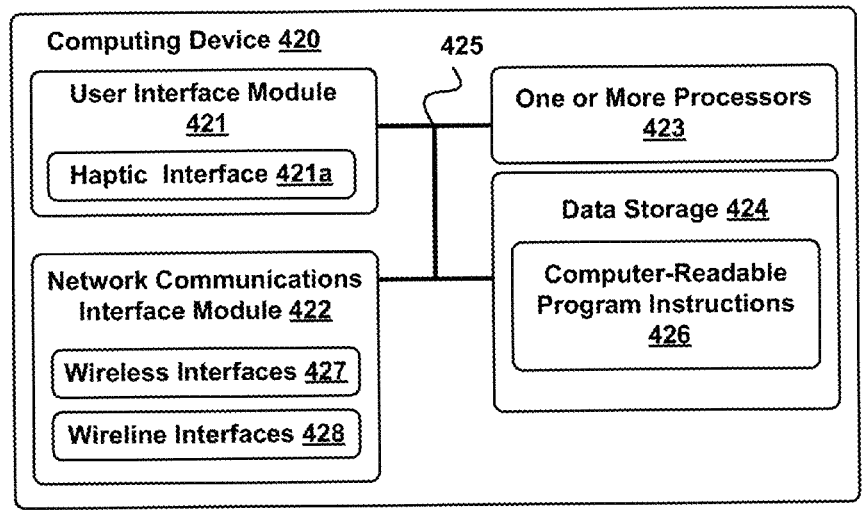
FIG. 4B is a block diagram of an example computing device, in accordance with an embodiment.

FIG. 4B is a block diagram of an example computing device 420 including user interface module 421, network-communication interface module 422, one or more processors 423, and data storage 424, in accordance with embodiments of the invention.

In particular, computing device 420 shown in FIG. 4A can be configured to perform one or more functions of client devices 404a-404c, network 406, and/or servers 408, 410. Computing device 420 may include a user interface module 421, a network-communication interface module 422, one or more processors 423, and data storage 424, all of which may be linked together via a system bus, network, or other connection mechanism 425.

Computing device 420 can be a desktop computer, laptop or notebook computer, personal data assistant (PDA), mobile phone, embedded processor, or any similar device that is equipped with at least one processing unit capable of executing machine-language instructions that implement at least part of the herein-described techniques and methods, including but not limited to method 500 described in more detail below with respect to FIG. 5.

User interface 421 can receive input and/or provide output, perhaps to a user. User interface 421 can be configured to send and/or receive data to and/or from user input from input device(s), such as a keyboard, a keypad, a touch screen, a computer mouse, a track ball, a joystick, and/or other similar devices configured to receive input from a user of the computing device 420. User interface 421 can be configured to provide output to output display devices, such as one or more cathode ray tubes (CRTs), liquid crystal displays (LCDs), light emitting diodes (LEDs), displays using digital light processing (DLP) technology, printers, light bulbs, and/or other similar devices capable of displaying graphical, textual, and/or numerical information to a user of computing device 420. User interface module 421 can also be configured to generate audible output(s), such as a speaker, speaker jack, audio output port, audio output device, earphones, and/or other similar devices configured to convey sound and/or audible information to a user of computing device 420. As shown in FIG. 4B, user interface can be configured with haptic interface 421a that can receive inputs related to a Haptic Interface Point, a remote device configured to be controlled by haptic interface 421a, and/or other inputs, and provide haptic outputs such as tactile feedback, vibrations, forces, motions, and/or other touch-related outputs.

Network-communication interface module 422 can be configured to send and receive data over wireless interfaces 427 and/or wired interfaces 428 via a network, such as network 406. Wired interface(s) 428, if present, can comprise a wire, cable, fiber-optic link and/or similar physical connection to a data network, such as a wide area network (WAN), a local area network (LAN), one or more public data networks, such as the Internet, one or more private data networks, or any combination of such networks. Wireless interface(s) 427 if present, can utilize an air interface, such as a ZigBee, Wi-Fi, and/or WiMAX interface to a data network, such as a WAN, a LAN, one or more public data networks (e.g., the Internet), one or more private data networks, or any combination of public and private data networks.

In some embodiments, network-communication interface module 422 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well as or in addition to those listed herein to secure (and then decrypt/decode) communications.

Processor(s) 423 can include one or more central processing units, computer processors, mobile processors, digital signal processors (DSPs), microprocessors, computer chips, and/or other processing units configured to execute machine-language instructions and process data. Processor(s) 423 can be configured to execute computer-readable program instructions 426 that are contained in data storage 424 and/or other instructions as described herein.

Data storage 424 can include one or more physical and/or non-transitory storage devices, such as read-only memory (ROM), random access memory (RAM), removable-disk-drive memory, hard-disk memory, magnetic-tape memory, flash memory, and/or other storage devices. Data storage 424 can include one or more physical and/or non-transitory storage devices with at least enough combined storage capacity to contain computer-readable program instructions 426 and any associated/related data structures.

Computer-readable program instructions 426 and any data structures contained in data storage 426 include computer-readable program instructions executable by processor(s) 423 and any storage required, respectively, to perform at least part of herein-described methods, including but not limited to method 500 described below with respect to FIG. 5.

Example Methods of Operation

Figure 5:
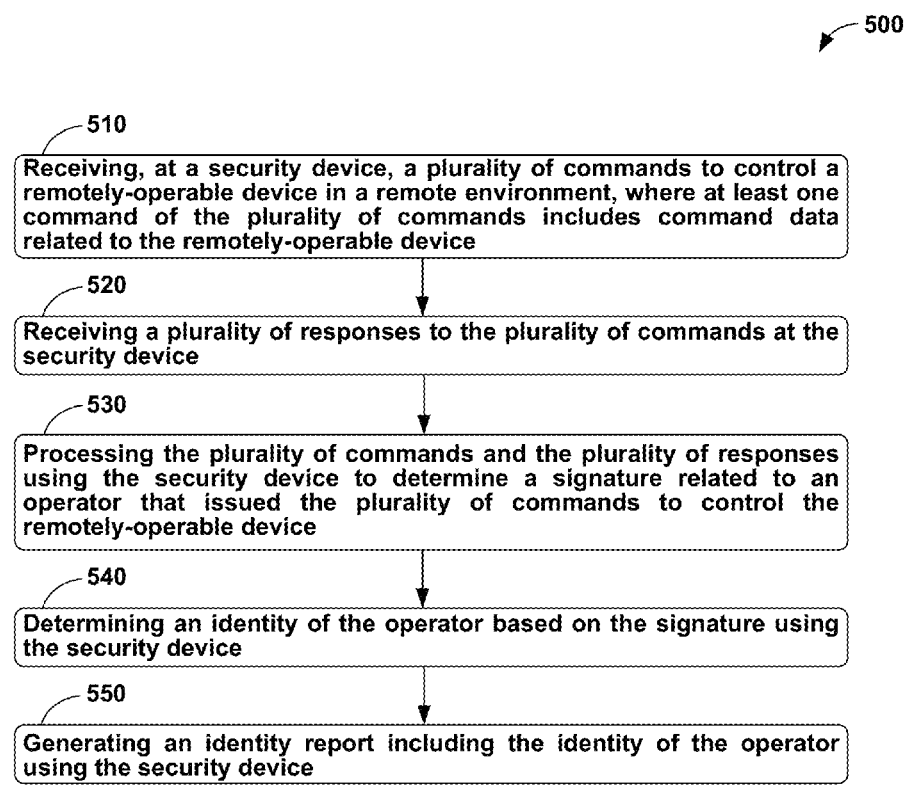
FIG. 5 is a flow chart of an example method, in accordance with an embodiment.

FIG. 5 is a flow chart of an example method 500. Method 500 can begin at block 510, where a security device can receive a plurality of commands to control a remotely-operable device in a remote environment. At least one command in the plurality of commands can include command data related to the remotely-operable device. In some embodiments, the remotely-operable device in the remote environment can include a surgical robot. In other embodiments, the plurality of commands can include at least one encrypted command. In particular embodiments, method 500 can include decrypting the at least one encrypted command. In some embodiments, the command data can include at least one data item selected from the group consisting of: a data item for a location related to the remotely-operable device, a data item for a position related to the remotely-operable device, a data item for an applied force related to the remotely-operable device, and a data item for an torque related to the remotely-operable device.

At block 520, the security device can receive a plurality of responses to the plurality of commands. In some embodiments, the plurality of responses can include a force-feedback response from the surgical robot.

At block 530, the security device can process the plurality of commands and the plurality of responses to determine a signature related to an operator that issued the plurality of commands to control the remotely-operable device. In some embodiments, the plurality of commands can include a first command and a second command, where the first command can be associated with a first time, wherein the second command can be associated with a second time, wherein the second command is immediately subsequent to the first command. In these embodiments, processing the plurality of commands and the plurality of responses to determine the signature can include determining a difference between the second time and the first time.

In other embodiments, processing the plurality of commands and the plurality of responses to determine the signature can include, but is not limited to processing signal features and/or features related to signals carrying the plurality of commands and/or the plurality of responses; e.g., wavelet parameters, mathematical transformations, frequency band content, and autoregressive model parameters. Then, processing the plurality of commands to determine the signature can include determining the signature based on a characteristic of a signal carrying at least one command of the plurality of commands and/or at least one response of the plurality of responses. In even other embodiments, machine learning methods can be utilized to learn a signature from prior data and classify commands and/or responses as being associated with the learned signature.

In other embodiments, the plurality of commands can include a first command and the plurality of responses can include a first response to the first command. Then, processing the plurality of commands and the plurality of responses to determine the signature can include: determining at least one characteristic of the first response and determining the signature based on the at least one characteristic of the first response.

At block 540, the security device can determine an identity of the operator based on the signature. At block 550, the security device can generate an identity report that includes the identity of the operator. In some embodiments, generating the identity report can include: determining whether the identity of the operator corresponds to an authorized operator by at least searching for the identity of the operator in one or more authorized operator records, where at least one record of the one or more authorized operator records can include an identity of an authorized operator of the remotely-operable device. After determining that the identity of the operator corresponds to an identity of an authorized operator; generating an identity report indicating that the identity of the operator corresponds to an authorized operator. In particular embodiments, method 500 can further include: after determining that the identity of the operator does not corresponds to an authorized operator; generating an identity report indicating that the identity of the operator does not correspond to an authorized operator.

In some embodiments, method 500 can further include: after generating the identity report, a second plurality of commands can be received. Based on the identity of the operator, an anomaly in the second plurality of commands can be detected. An anomaly report can be generated that indicates the detected anomaly in the second plurality of commands.

Figure 6:
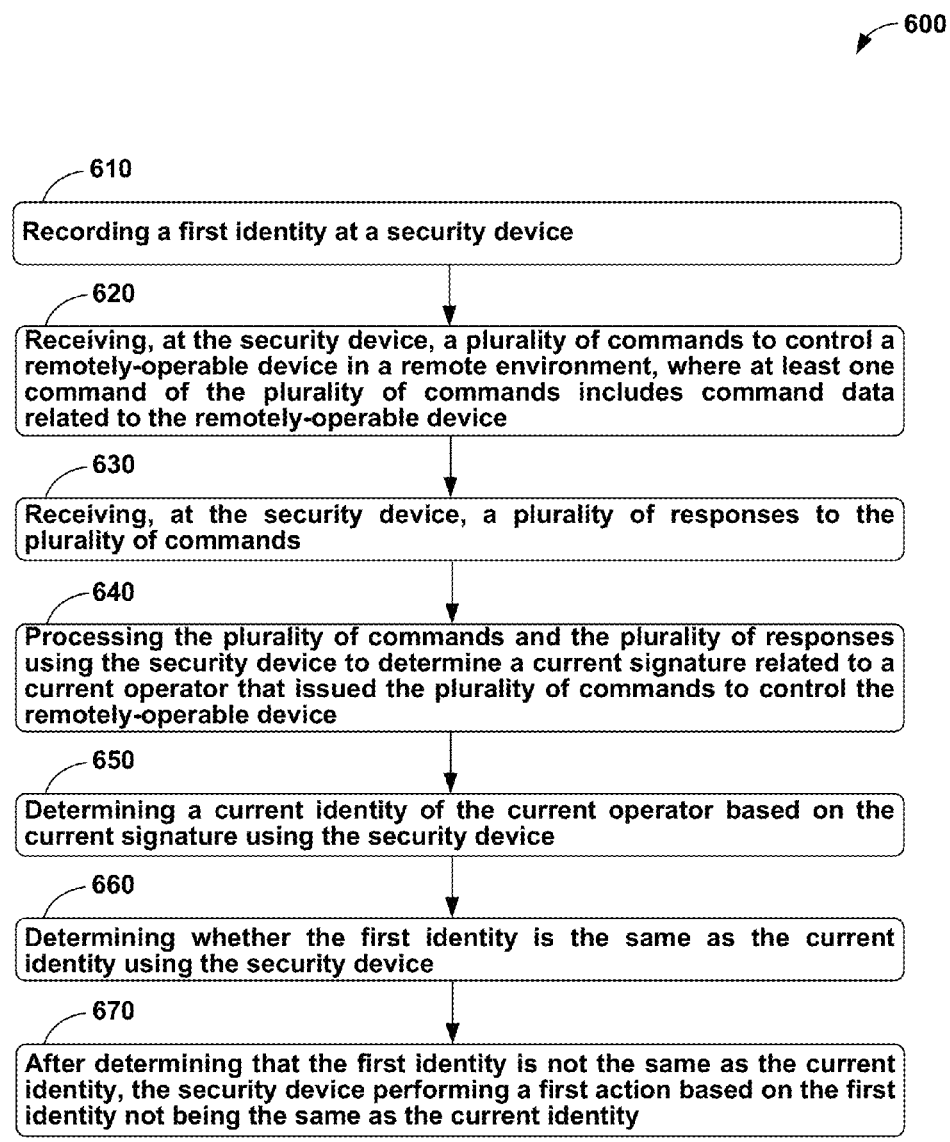
FIG. 6 is a flow chart of another example method, in accordance with an embodiment.

FIG. 6 is a flow chart of an example method 600. Method 600 can begin at block 610, where a security device can record a first identity. At block 620, a security device can receive a plurality of commands to control a remotely-operable device in a remote environment. At least one command in the plurality of commands can include command data related to the remotely-operable device.

At block 630, the security device can receive a plurality of responses to the plurality of commands. At block 640, the security device can process the plurality of commands and the plurality of responses to determine a current signature related to a current operator that issued the plurality of commands to control the remotely-operable device.

At block 650, the security device can determine a current identity of the current operator based on the current signature. At block 660, the security device can determine whether the first identity is the same as the current identity. In some embodiments, determining whether the first identity is the same as the current identity can include: accessing a first signature stored with the first identity; and determining whether the first identity equals the current identity by at least determining whether the first signature equals the current signature.

At block 670, after determining that the first identity is not the same as the current identity the security device can perform a first action based on the first identity not being the same as the current identity. In some embodiments, the first action can include generating an anomaly report indicating that the first identity is not the same as the current identity. In other embodiments, the first action can include inhibiting subsequent commands issued by the current operator from controlling the remotely-operable device. In particular other embodiments, inhibiting the subsequent commands can include inhibiting transmission of the subsequent commands to the remotely-operable device.

In still other embodiments, method 600 can further include: after determining that the first identity is the same as the current identity, the security device can perform a second action based on the first identity being the same as the current identity, where the first action differs from the second action. In particular embodiments, the second action can include enabling subsequent commands issued by the current operator to control the remotely-operable device. In specific of the particular other embodiments, enabling the subsequent commands can include enabling transmission of the subsequent commands to the remotely-operable device.

Figure 7:
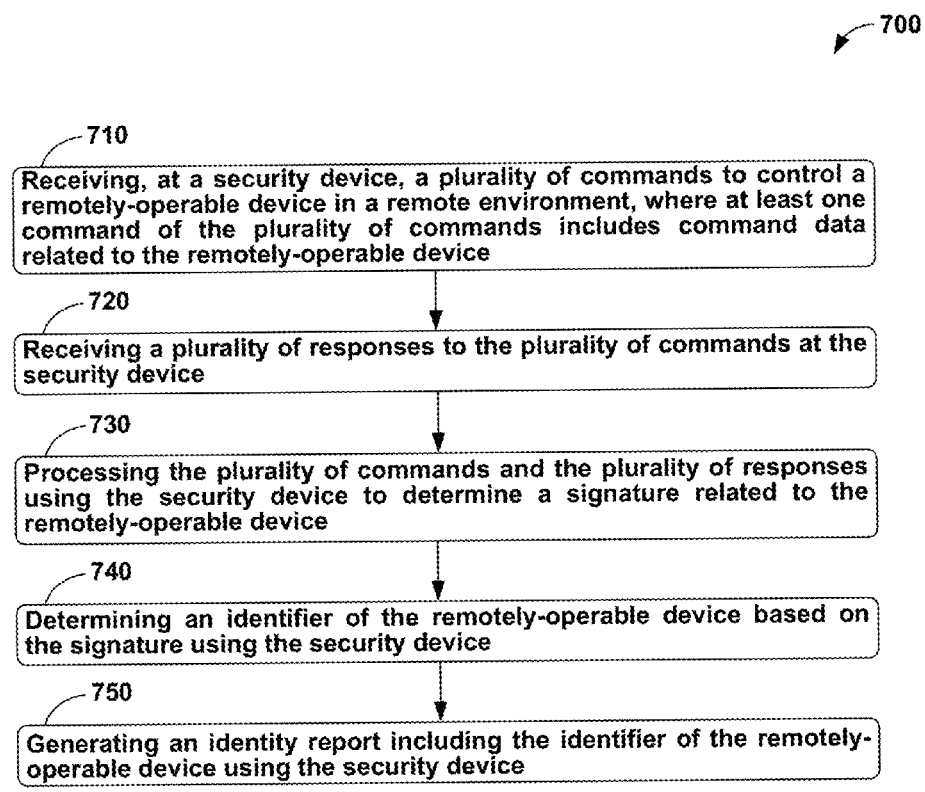
FIG. 7 is a flow chart of even another example method, in accordance with an embodiment.

FIG. 7 is a flow chart of an example method 700. Method 700 can begin at block 710, where a security device can receive a plurality of commands to control a remotely-operable device in a remote environment. At least one command in the plurality of commands can include command data related to the remotely-operable device. In some embodiments, the remotely-operable device in the remote environment can include a surgical robot. In other embodiments, the plurality of commands can include at least one encrypted command. In particular embodiments, method 700 can include decrypting the at least one encrypted command. In some embodiments, the command data can include at least one data item selected from the group consisting of: a data item for a location related to the remotely-operable device, a data item for a position related to the remotely-operable device, a data item for an applied force related to the remotely-operable device, and a data item for an torque related to the remotely-operable device.

At block 720, the security device can receive a plurality of responses to the plurality of commands. In some embodiments, the plurality of responses can include a force-feedback response from the surgical robot.

At block 730, the security device can process the plurality of commands and the plurality of responses to determine a signature related to the remotely-operable device. In some embodiments, the plurality of commands can include a first command and a second command, where the first command can be associated with a first time, wherein the second command can be associated with a second time, wherein the second command is immediately subsequent to the first command. In these embodiments, processing the plurality of commands and the plurality of responses to determine the signature can include determining a difference between the second time and the first time.

In other embodiments, processing the plurality of commands and the plurality of responses to determine the signature can include, but is not limited to processing signal features and/or features related to signals carrying the plurality of commands and/or the plurality of responses; e.g., wavelet parameters, mathematical transformations, frequency band content, and autoregressive model parameters. Then, processing the plurality of commands to determine the signature can include determining the signature based on a characteristic of a signal carrying at least one command of the plurality of commands and/or at least one response of the plurality of responses. In even other embodiments, machine learning methods can be utilized to learn a signature from prior data and classify commands and/or responses as being associated with the learned signature.

In other embodiments, the plurality of commands can include a first command and the plurality of responses can include a first response to the first command. Then, processing the plurality of commands and the plurality of responses to determine the signature can include: determining at least one characteristic of the first response and determining the signature based on the at least one characteristic of the first response.

At block 740, the security device can determine an identifier of the remotely-operable device based on the signature. In some embodiments, the identifier of the remotely-operable device can be at least one identifier selected from the group of identifiers consisting of a name of the remotely-operable device, a serial number of the remotely-operable device, a manufacturing date for the remotely-operable device, an electronic address (e.g., Internet Protocol (IP) address, Media Access layer (MAC) address) for the remotely-operable device, a Vehicle Identification Number (VIN) for the remotely-operable device, and an asset number for the remotely-operable device.

At block 750, the security device can generate an identity report that includes the identifier of the remotely-operable device. In some embodiments, generating the identity report can include: determining whether the identifier of the remotely-operable device corresponds to an authorized remotely-operable device by at least searching for the identifier of the remotely-operable device in one or more authorized device records, where at least one record of the one or more authorized device records can include an identifier of an authorized remotely-operable device. After determining that the identifier of the remotely-operable device corresponds to the authorized identifier of the remotely-operable device, an identity report can be generated indicating that the identifier of the remotely-operable device corresponds to an authorized identifier of the remotely-operable device. In particular embodiments, method 700 can further include: after determining that the identifier of the remotely-operable device does not correspond to an authorized identifier of the remotely-operable device, generating an identity report indicating that the identifier of the remotely-operable device does not correspond to an authorized identifier of the remotely-operable device.

In some embodiments, method 700 can further include: after generating the identity report, a second plurality of commands can be received. Based on the identifier of the remotely-operable device, an anomaly in the second plurality of commands can be detected. An anomaly report can be generated that indicates the detected anomaly in the second plurality of commands.

Conclusion

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein," "above" and "below" and words of similar import, when used in this application, shall refer to this application as a whole and not to any particular portions of this application.

The above description provides specific details for a thorough understanding of, and enabling description for, embodiments of the disclosure. However, one skilled in the art will understand that the disclosure may be practiced without these details. In other instances, well-known structures and functions have not been shown or described in detail to avoid unnecessarily obscuring the description of the embodiments of the disclosure. The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize.

All of the references cited herein are incorporated by reference. Aspects of the disclosure can be modified, if necessary, to employ the systems, functions and concepts of the above references and application to provide yet further embodiments of the disclosure. These and other changes can be made to the disclosure in light of the detailed description.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

Numerous modifications and variations of the present disclosure are possible in light of the above teachings.

What is claimed:

1. A method, comprising:
   receiving, at a security device, a plurality of commands to control a remotely-operable device in a remote environment, wherein at least one command in the plurality of commands comprises command data related to the remotely-operable device;
   receiving a plurality of responses to the plurality of commands at the security device;
   processing the plurality of commands and the plurality of responses using the security device to determine a signature related to an operator that issued the plurality of commands to control the remotely-operable device, wherein the signature is determined based on a pattern of use related to one or more tasks as indicated by the plurality of commands and plurality of responses, wherein the plurality of commands comprises a first command and a second command, wherein the first command is associated with a first time, wherein the second command is associated with a second time, wherein the second command is immediately subsequent to the first command, and wherein processing the plurality of commands and the plurality of responses to determine the signature comprises determining a difference between the second time and the first time;

determining an identity of the operator based on the signature using the security device; and generating an identity report comprising the identity of the operator using the security device.

2. The method of claim 1, further comprising:

after generating the identity report, receiving a second plurality of commands;

detecting an anomaly in the second plurality of commands based on the identity of the operator; and generating an anomaly report indicating the detected anomaly in the second plurality of commands.

3. The method of claim 1, wherein generating the identity report comprises:

determining whether the identity of the operator corresponds to an authorized operator by at least searching for the identity of the operator in one or more authorized operator records, wherein at least one record of the one or more authorized operator records comprises an identity of an authorized operator of the remotely-operable device; and after determining that the identity of the operator corresponds to an identity of an authorized operator; generating an identity report indicating that the identity of the operator corresponds to an authorized operator.

4. The method of claim 3, further comprising:

after determining that the identity of the operator does not corresponds to the identity of an authorized operator; generating an identity report indicating the identity of the operator does not correspond to an authorized operator.

5. The method of claim 1, wherein the remotely-operable device in the remote environment comprises a surgical robot.

6. The method of claim 5, wherein the plurality of responses comprise a force-feedback response from the surgical robot.

7. The method of claim 1, wherein the plurality of commands comprises at least one encrypted command, and wherein the method further comprises:

decrypting the at least one encrypted command.

8. The method of claim 1, wherein the identity report further comprises identification information about the remotely-operable device.

9. The method of claim 1, wherein the plurality of commands comprises a first command, wherein the plurality of responses comprises a first response to the first command, and wherein processing the plurality of commands and the plurality of responses to determine the signature comprises:

determining at least one characteristic of the first response; and determining the signature based on the at least one characteristic of the first response.

10. The method of claim 9, wherein the at least one characteristic comprises a characteristic related to force feedback.

11. The method of claim 1, wherein the command data comprises at least one data item selected from the group consisting of: a data item for a location related to the remotely-operable device, a data item for a position related to the remotely-operable device, a data item for an applied force related to the remotely-operable device, and a data item for an torque related to the remotely-operable device.

12. A security device, comprising:

a processor; and non-transitory tangible computer readable medium configured to store instructions that, when executed by the processor, cause the security device to perform functions comprising:

receiving a plurality of commands to control a remotely-operable device in a remote environment, wherein at least one command in the plurality of commands comprises command data related to the remotely-operable device;

receiving a plurality of responses to the plurality of commands;

processing the plurality of commands and the plurality of responses to determine a signature related to an operator of the remotely-operable device, wherein the operator issued the plurality of commands, and wherein the signature is determined based on a pattern of use related to one or more tasks as indicated by the plurality of commands and plurality of responses, wherein the plurality of commands comprises a first command and a second command, wherein the first command is associated with a first time, wherein the second command is associated with a second time, wherein the second command is immediately subsequent to the first command, and wherein processing the plurality of commands and the plurality of responses to determine the signature comprises determining a difference between the second time and the first time;

determining an identity of the operator based on the signature, and generating an identity report comprising the identity of the operator.

13. The security device of claim 12, wherein the functions further comprise:

after generating the identity report, receiving a second plurality of commands;

detecting an anomaly in the second plurality of commands based on the identity of the operator; and generating an anomaly report indicating the detected anomaly in the second plurality of commands.

14. The security device of claim 12, wherein the remotely-operable device in the remote environment comprises a surgical robot.

15. The security device of claim 12, wherein processing the plurality of commands to determine the signature comprises determining the signature based on a characteristic of a signal carrying at least one command of the plurality of commands and/or at least one response of the plurality of responses.

16. The security device of claim 12, wherein the plurality of commands comprises a first command, wherein the plurality of responses comprises a first response to the first command, and wherein processing the plurality of commands to determine the signature comprises:

determining at least one characteristic of the first response; and determining the signature based on the at least one characteristic of the first response.

17. The security device of claim 12, wherein the command data comprises at least one data item selected from the group consisting of: a data item for a location related to the remotely-operable device, a data item for a position related to the remotely-operable device, a data item for an applied force related to the remotely-operable device, and a data item for an torque related to the remotely-operable device.

18. A method, comprising:
recording a first identity at a security device;
receiving, at the security device, a plurality of commands to control a remotely-operable device in a remote environment, wherein at least one command in the plurality of commands comprises command data related to the remotely-operable device;
receiving, at the security device, a plurality of responses to the plurality of commands;
processing the plurality of commands and the plurality of responses using the security device to determine a current signature related to a current operator that issued the plurality of commands to control the remotely-operable device, wherein the current signature is determined based on a pattern of use related to one or more tasks as indicated by the plurality of commands and plurality of responses, wherein the plurality of commands comprises a first command and a second command, wherein the first command is associated with a first time, wherein the second command is associated with a second time, wherein the second command is immediately subsequent to the first command, and wherein processing the plurality of commands and the plurality of responses to determine the signature comprises determining a difference between the second time and the first time;
determining a current identity of the current operator based on the current signature using the security device;
determining whether the first identity is the same as the current identity using the security device; and
after determining that the first identity is not the same as the current identity, the security device performing a first action based on the first identity not being the same as the current identity.

19. The method of claim 18, wherein the first action comprises generating an anomaly report indicating that the first identity is not the same as the current identity.

20. The method of claim 18, wherein the first action comprises inhibiting subsequent commands issued by the current operator from controlling the remotely-operable device.

21. The method of claim 20, wherein inhibiting the subsequent commands comprises inhibiting transmission of the subsequent commands to the remotely-operable device.

22. The method of claim 18, further comprising:
after determining that the first identity is the same as the current identity, the security device performing a second action based on the first identity being the same as the current identity, wherein the first action differs from the second action.

23. The method of claim 22, wherein the second action comprises enabling subsequent commands issued by the current operator to control the remotely-operable device.

24. The method of claim 23, wherein enabling the subsequent commands comprises enabling transmission of the subsequent commands to the remotely-operable device.

25. The method of claim 18, wherein determining whether the first identity equals the identity of the current operator comprises:
accessing a first signature stored with the first identity; and
determining whether the first identity equals the current identity by at least determining whether the first signature equals the current signature.

* * * * *